Figure 1:
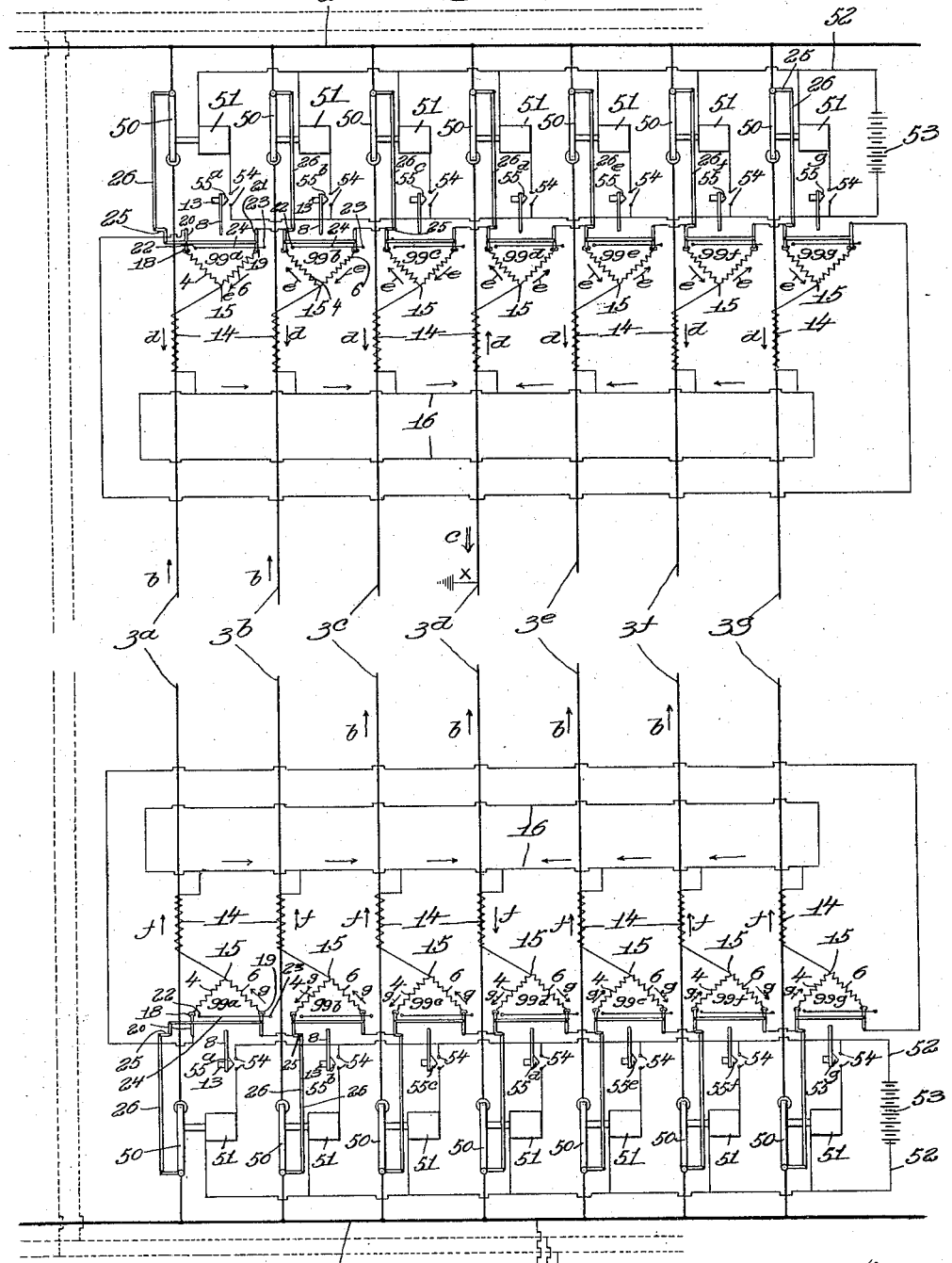

W. H. COLE.
FAULT DETECTOR.
APPLICATION FILED JUNE 26, 1912.

1,152,880.

Patented Sept. 7, 1915.
3 SHEETS—SHEET 1.

Witnesses:
Fred S. Grumbal.
Warren O'Neil.

Inventor,
William H. Cole,
by Edwards Hand &
Smith. Attys.

W. H. COLE.
FAULT DETECTOR.
APPLICATION FILED JUNE 26, 1912.
1,152,880.
Patented Sept. 7, 1915.
3 SHEETS—SHEET 2.
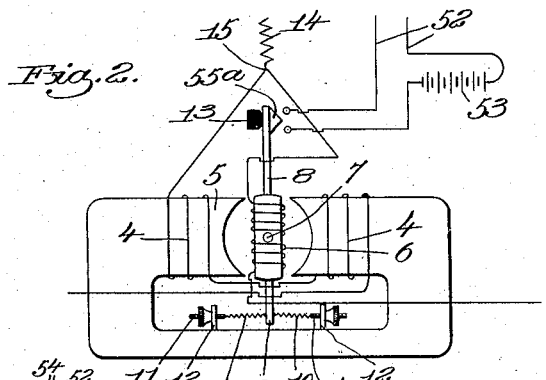
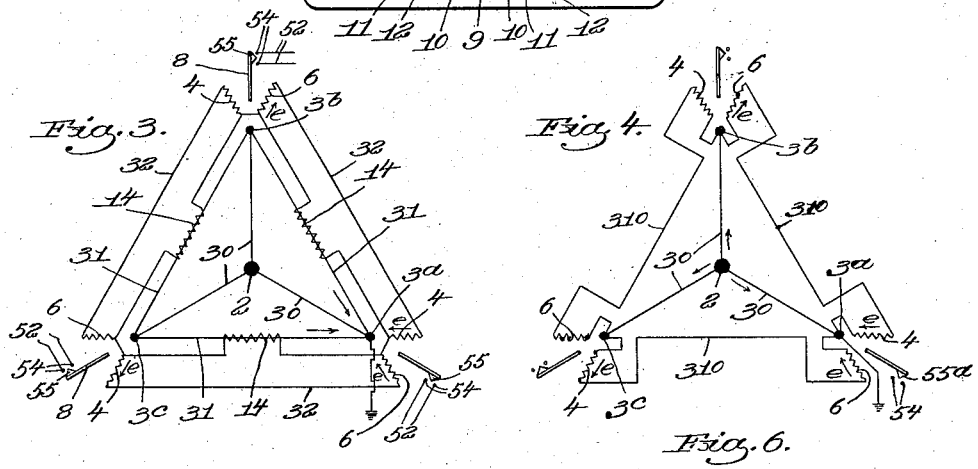
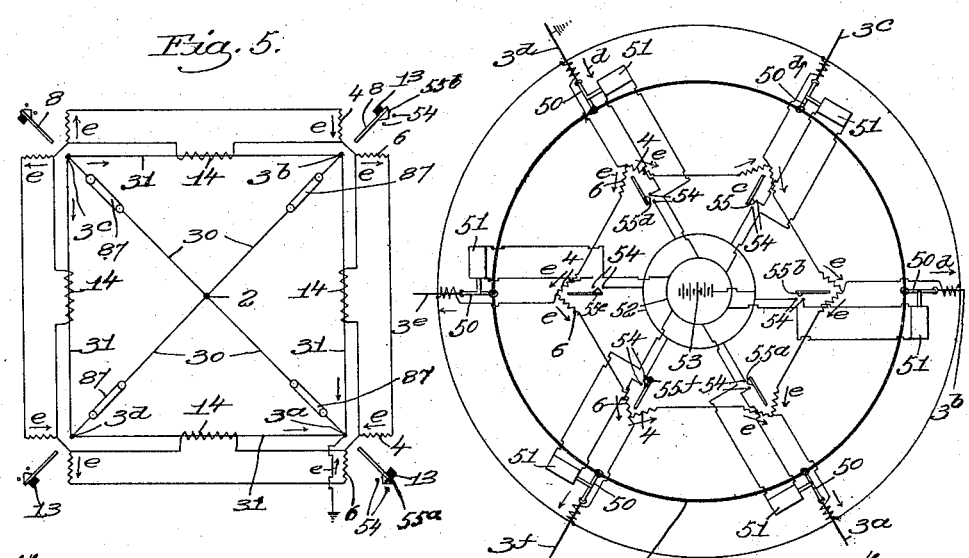
Witnesses:
Inventor,
William H. Cole,
by Edwards, Heard
& Smith, Attys.

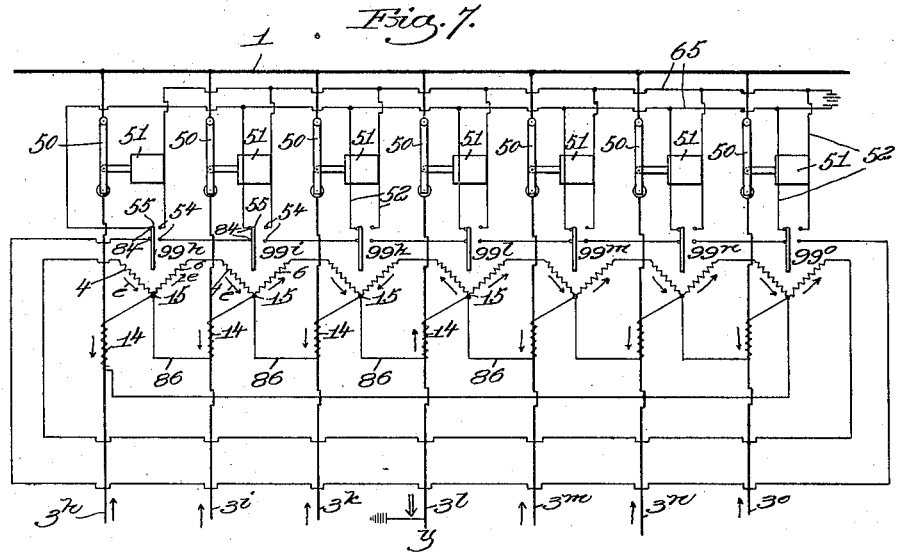
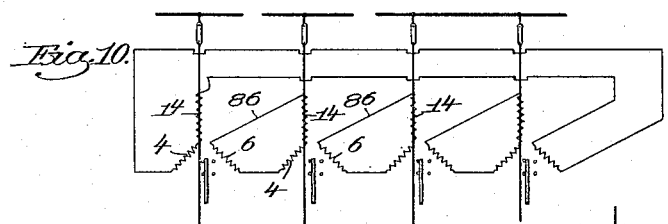
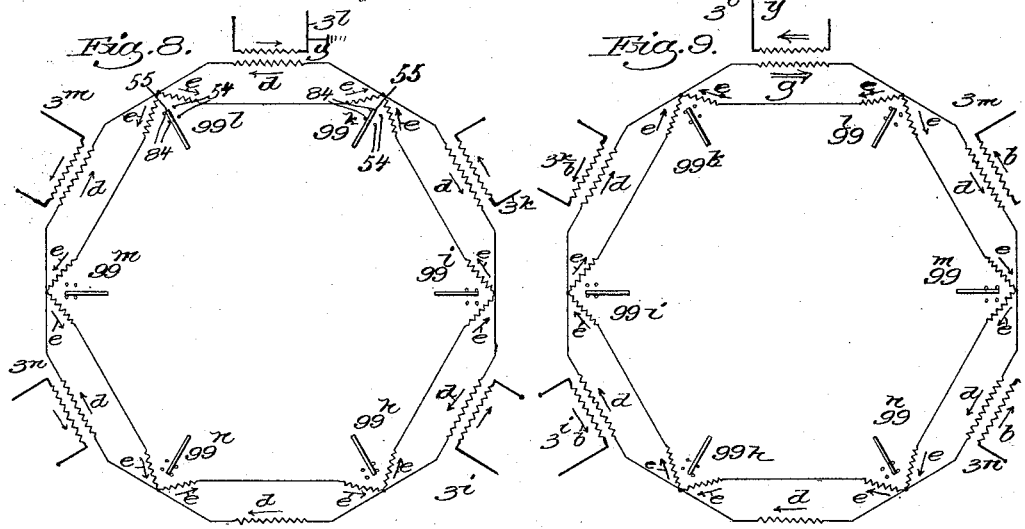
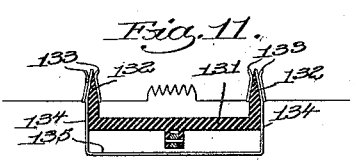

UNITED STATES PATENT OFFICE.

WILLIAM H. COLE, OF WALTHAM, MASSACHUSETTS.

FAULT-DETECTOR.

1,152,880. Specification of Letters Patent. Patented Sept. 7, 1915.

Application filed June 26, 1912. Serial No. 705,967.

*To all whom it may concern:*

Be it known that I, WILLIAM H. COLE, a citizen of the United States, residing at Waltham, county of Middlesex, State of Massachusetts, have invented an Improvement in Fault-Detectors, of which the following description, in connection with the accompanying drawing, is a specification, like characters on the drawing representing like parts.

This invention relates to a device for detecting and isolating faulted conductors in an electrical distributing system and particularly to a device of this nature which is especially adapted for use in a system where there are a plurality of working conductors extending between two separated stations of the system for conveying power from one station to the other.

One of the principal objects of the invention is to provide a device of this nature which will operate automatically to detect a fault occurring in any one of said number of conductors and will also operate automatically to isolate the faulted conductor from the system without, however, disturbing the operation of the other conductors.

Assuming there are several conductors connected in parallel and extending from one station of a distributing system to another, and one of said conductors becomes involved in a short circuit or develops some other fault causing an abnormal current flow, my invention if applied to the distributing system will automatically cut said faulted conductor out from the system while leaving the remaining conductors in operation to carry the load.

My invention involves the use of a plurality of relays which are normally inoperative, but each of which is rendered operative by the occurrence of a fault in the corresponding conductor thereby to actuate a cut-out mechanism which will cut out said conductor from the system. The relays which I employ do not depend for their operation upon the potential of the system at the points where they are installed, but, on the other hand, are so arranged that whenever a fault occurs in any conductor, they are operatively energized by the abnormal current conditions in said conductor due to the fault, whether such abnormal current conditions are in the nature of an interrupted current due to an open circuit, or whether such abnormal current conditions are in the nature of an abnormal current flowing to the fault at any given instant, either in a normal direction or as a so-called reverse current.

In order to clearly describe the principle of the invention, I have shown in the drawings some diagrammatic views which are illustrative of the operation of the invention, it being understood, of course, that the drawings show selected embodiments only of the invention and that no attempt has been made to illustrate all variations which the invention might assume.

Figure 1 is a diagrammatic view of the conductors extending between two stations showing diagrammatically the relays for each conductor; Fig. 2 is a view of one of the relays; Figs. 3, 4, 5 and 6 are diagrammatic views showing different arrangements of the parts of the invention; Fig. 7 is a view somewhat similar to Fig. 1, but showing a different embodiment of the invention; Figs. 8, 9, and 10 are other diagram views showing the operation of the device shown in Fig. 7; Fig. 11 is a detail of a short-circuiting jack for cutting out the relays and associated control apparatus and wiring of any isolated conductor and also to preserve the continuity of the said control connections of the un-faulted conductors.

Referring first to Fig. 1, I have shown at 1 and 2 two buses or mains at two separated stations in an electrical-distributing system, and at $3^a$, $3^b$, $3^c$, $3^d$, $3^e$, $3^f$, $3^g$ I have shown a plurality of working conductors extending between the buses for carrying current from one station to the other, said conductors being all connected in parallel. These two stations containing the main buses 1 and 2 may be either generating or distributing points in an electrical-distributing system whether of the ring, tandem, radial or any other suitable type. Since the conductors $3^a$—$3^g$ are all in parallel, each will carry its proper proportion of the current. Each conductor is connected to the main buses at each end by means of a switch or cut-out 50 which is normally closed, but which is adapted to be opened by an actuating magnet 51. The magnets 51 are all connected in parallel in a circuit 52 containing a battery or other source of electrical energy 53, and means are provided for closing the circuit through any one of said magnets thereby to open the corresponding switch whenever a fault is developed in the corresponding conductor.

The circuit through which magnet 51 is energized has in it a pair of terminals 54 which are normally open, but which are adapted to be closed or bridged by the action of a suitable relay which is rendered operative upon the occurrence of a fault, it being understood that preferably there is one such relay associated with each end of each conductor, and that the relays are so constructed that when a fault is developed in any conductor, the corresponding relays are operatively energized to bridge the corresponding terminals 54, thus energizing the corresponding magnets 51 and cutting out the conductor from the system. These relay contacts are designated $55^a$, $55^b$, $55^c$, $55^d$, $55^e$, $55^f$, $55^g$, respectively, and the relays associated with the various conductors are designated $99^a$, $99^b$, $99^c$, $99^d$, $99^e$, $99^f$, $99^g$, respectively. These relays are shown diagrammatically only in Fig. 1.

The relay which I prefer to use is shown in detail in Fig. 2, although this particular construction is not essential, as any relay which will operate properly might be used. The relay shown involves a stationary coil 4 having a U-shaped core 5 between the ends of which is situated a movable or rotatable coil 6 suitably pivoted at 7. This movable coil carries an arm 8 which sustains at its end the contact $55^a$ and said coil also is shown as carrying an arm 9 which is acted upon by two springs 10 that center the coil and constitute means for adjusting the sensitiveness of the relay. Each spring 10 is shown as connected at one end to the arm 9 and at the other end to an adjustable screw 11 mounted in suitable bearings 12.

13 is a stop against which the arm 8 rests under normal conditions and which limits the swinging movement of the arm away from the contacts 54. Each conductor has associated therewith a current transformer to the secondary coil 14 of which both the coils 4 and 6 of the corresponding relay are connected at the junction point 15. Each of the secondary coils 14 is connected to the common connection 16 which is herein shown as a ring connection, although this is not essential, and the movable coil 6 of one relay is connected to the stationary coil 4 of the next adjacent relay, all as clearly seen in Fig. 1. This connection and wiring is such that when the current is flowing normally through the conductors $3^a$—$3^g$, the primary current in the various current transformers will induce in all the secondary coils 14 potentials in similar directions and of equal values. Under these conditions, there will be no current flowing in the secondaries 14 nor in the stationary and movable coils 4 and 6 of the various relays, and as a result the relays will all be deënergized and inoperative. If, however, a fault occurs in any one of the conductors, as, for instance, a short circuit involving the conductor $3^d$ at $x$, there will be established a current of abnormal value in said conductor $3^d$ from each of the buses 1 and 2, and this abnormal current will operate the relays at each end of the conductor $3^d$, and thus cut said conductor out from the system.

Assuming that the distributing system is one carrying alternating current and in which the bus 1 is connected to the generator 20, and the bus 2 is a receiving bus, and also assuming that at some given instant the current is flowing in the various conductors in the direction of the arrows $b$, then the occurrence of the short circuit at $x$ will cause a reverse current to flow to the short circuit from the bus 2, as indicated by the arrows $c$, and this reverse current will induce a potential in the secondary 14 associated with the end of the conductor $3^d$ which is connected with the bus 2, which induced potential is opposite in sign to that in the other secondaries 14. The result will be that at said given instant a current will be established through the various secondaries at the ends of the conductors adjacent the bus 2 in the direction of the arrows $d$, Fig. 1, and this current will be distributed through the movable and stationary coils of the various relays and the ring connection 16 as indicated by the arrows $e$, that is, the current set up in the secondary 14 associated with the conductor $3^f$ will divide at the junction point 15 of the relay $99^d$, part of the current flowing through the relays $99^c$, $99^b$, $99^a$, and part through the relays $99^e$, $99^f$, $99^g$. The direction of this current through the relays is such that with respect to the relay $99^d$ the current flows at some given instant in both the stationary and movable coils away from the junction point 15, while with respect to the relays $99^b$, $99^c$, $99^e$, $99^f$ the current flow will be toward the junction point 15 in one coil and away from said point in the other coil, and with respect to the relays $99^a$, and $99^g$, which are substantially electrically opposite the relay $99^d$, there will be current flow in one coil only.

It will be understood that the arrows $b$, $c$, $d$ and $e$ represent instantaneous direction, and that with an alternating current these directions will be reversed at each alternation. These arrows, however, show the relative direction of the current in the various circuits and connections at some given instant. By the term "current flow" as herein used I mean relative direction of flow at any given instant.

The relays are so constructed that when the current flows in both coils of any relay simultaneously either toward or from the junction point 15, then the relay becomes operatively energized and the movable coil will be actuated to bring the contacts 55 against the contacts 54, while where the current flows toward the junction point 15 in one coil and away from it in the other coil or flows in one coil only of any relay, said relay is non-operatively energized, and the tendency, if any, will be for the movable coil to rotate in the opposite direction thereby maintaining the arm 8 against the stop 13. It will now be obvious that the occurrence of the short circuit at $x$ will cause the relay $99^d$ to be operatively energized thereby closing the circuit 52 through the corresponding magnet 51 and opening the switch 50 connected to the magnet. One end of the conductor $3^d$ is thus isolated from the system. The relay at the other end of the conductor $3^d$ will also be operated by reason of the increased current which will flow through said conductor $3^d$ to the short circuit from the bus 1. This increased current will cause a potential to be developed in the secondary 14 in the current transformer associated with the conductor $3^d$ which is sufficient to overcome the potential of the other secondaries 14 and thus a current will be established through the various secondaries at any given instant, as indicated by the arrows $f$, in Fig. 1, which current will distribute itself through the relays as indicated by the arrows $g$, thus operatively energizing the relay $99^d$ and non-operatively energizing the other relays. The switch 50 at the end of the conductor $3^d$ adjacent the bus 1 will thus also be opened thereby isolating the faulted conductor from the system. The operation of the relays $99^d$ at the ends of the conductor $3^d$ does not affect the other relays, and, therefore, the other conductors will still remain in the system to carry current. The relays at opposite ends of any faulted conductor may operate successively or simultaneously.

As soon as any faulted conductor has been disconnected from the system, it is desirable to open the circuit through the secondary of the current transformer associated with said conductor, and, therefore, I have provided means whereby when any switch 50 is operated the current transformer and relay which controls said switch will be open-circuited without breaking the circuit including the other relays. While this may be accomplished in various ways, I have herein shown the stationary and movable coils of each relay as leading to contacts 18 and 19 which normally have engagement with the connected switch arms 20 and 21, said arms being electrically connected to the coils of the adjacent relays. These connected switch arms are also connected either electrically or mechanically to the switch 50, so that when the switch 50 is opened the arms 20 and 21 will be thrown over onto the contacts 22 and 23, said latter contacts being connected together by a wire 24. I have herein shown a mechanical connection between each switch 50 and the switch arms 21 and 22, said connection being in the form of bell cranks and links 25 and 26, but any suitable connection might be employed. With this construction it will be obvious that whenever any relay is operated thereby to actuate its switch 50, the movement of the switch 50 will throw the switch blades 20 and 21 onto the contacts 22 and 23 thereby open-circuiting the current transformer secondary and relay coils and establishing the necessary working connections for the balance of the system through the wire 24.

In case there are an even number of conductors connecting the two bus-bars 1 and 2, then whenever a fault occurs in any one conductor, the relays of the electrically-opposite conductor will also be affected. The reason for this is perhaps best seen from the diagram shown in Fig. 6 wherein the conductors designated $3^a$—$3^f$, respectively, are indicated in ring formation radiating from the bus 2 which is shown in the form of a ring. The arrangement of the relays and wiring in Fig. 6 is the same as in Fig. 1. If, for instance, a short circuit occurs involving conductor $3^d$, then the relays connected with said conductor will be operated, as above described, and the relays connected with the conductors $3^b$ $3^c$, $3^e$ and $3^f$ will be non-operatively energized and inactive. With respect to the relay connected to the conductor $3^a$, however, which is situated electrically opposite conductor $3^d$, it will be seen that currents will be set up in the stationary and movable coils 4 and 6 which are in a direction to operate said relay, but the current which is developed in the coils of this relay will be very much less than that developed in the coils of the relay for the conductor $3^d$ and the relays can be so adjusted that the speed of operation thereof will depend on the strength of the current passing through the coils. When this is the case the heavier current passing through the coils of the relays connected with the conductor $3^d$ will cause said relay to operate thereby to isolate said conductor from the system before the relay connected with the conductor $3^a$ can operate, and as soon as the faulted conductor $3^d$ has been isolated from the system then the relays all return to their normal condition.

My invention is also applicable to a construction wherein the conductors are connected by balanced buses, and in Figs. 3, 4 and 5 I have illustrated diagrammatically some constructions embodying this arrangement. These figures are supposed to show the main bus 2 and the parallel-connected conductors $3^a$, $3^b$ and $3^c$ in end view only, said conductors being connected to the main bus 2 by connections 30. The conductors are connected together by balanced buses 31, said buses being connected to the conductors at points having substantially the same potential so that under normal current conditions there will be no current flow in the buses. In applying my invention to this construction I associate the current transformer for the relays with the balanced buses instead of directly with the conductors, and in Fig. 3, 14 designates the secondaries of the current transformers, these being connected to the stationary and movable coils 4 and 6 of the various relays. The coil 4 of each relay is also connected to the coil 6 of the next adjacent relay by a connection 32. The relays are shown diagrammatically only, as they are in Fig. 1, but it will be understood that they may have the constructional features shown in Fig. 2. With this arrangement it will readily be seen that under normal conditions the relays will all be deënergized and, therefore, inoperative. If, however, a short circuit occurs involving the conductor $3^a$, then there will be a current flow to said conductor from the bus 2, not only through the connection 30, but also through the balanced buses 31 which are connected to said faulted conductor. The flow of current in the balanced buses will energize the current transformers associated therewith, thus causing current to flow in the secondaries of said transformers at some particular instant in the direction of the arrows $e$, on Fig. 3. This current will flow through the coils 4 and 6 of the relay associated with the faulted conductor, and the current in the coils of the relay will be in a direction to operatively energize said relay, thus causing it to act, with the result that the faulted conductors $3^a$ will be cut out from the system. The current which operatively energizes the relay connected with the conductor $3^a$ will also pass through the other relays, but will act only to non-operatively energize said relays, for it will be seen from Fig. 3 that current will flow through one coil only of each relay.

In Fig. 4 I nave shown an arrangement whereby the current transformers 14 are omitted and the currents which are developed in the balanced buses pass directly into the relays and thus energize them. In this embodiment the balanced buses are shown at 310, and they are connected directly to the coils 4 and 6 of the relays. Whenever a fault occurs in any one of the conductors, as in the conductor $3^a$, for instance, and current flows to said fault through the balanced buses, then such current will operatively energize the relay associated with the faulted conductor, thus causing said conductor to be isolated from the system, but will non-operatively energize the other relays.

In Fig. 5 I have shown a diagram view similar to Figs. 3 and 4 but involving four conductors. In this embodiment the balanced buses 31 are used, each of which has a current transformer associated therewith and the operation of the device will be substantially the same as that shown in Fig. 3. Assuming that the conductor $3^a$ develops a fault, it will be noted that the current will be developed in the relay circuits in a direction to operatively energize the relay connected with the faulted conductor and to non-operatively energize the relays associated with the conductors $3^b$ and $3^d$. With respect to the conductor $3^c$, however, which is electrically opposite to the conductor $3^a$, the current will pass through said relay in a direction to operatively energize it, but the amount of current which this relay receives is very much less than that received by the relay connected with the faulted conductor, and if the relays are adjusted so that they will act more quickly under the influence of a strong current than they will under the influence of a weak current, the relay associated with the faulted conductor will act first, thus cutting said faulted conductor out of the system, and as soon as the faulted conductor is isolated the normal conditions will be established in the other relays, thus preventing the relay associated with the conductor $3^c$ from operating. The above condition arises only in cases where the number of conductors is an even number, for if there be an odd number of conductors then the electrical balance at a point electrically opposite the faulted conductor will take place between two relays, as will be clear upon referring to Figs. 3 and 4.

In the embodiment of my invention shown in Fig. 5 it is desirable that some suitable means be used to open circuit the connection or lead 30 connecting the main bus 2 to the balanced bus at the point where said faulted conductor is normally connected, in order to render the balance of the system operative to the fullest degree of efficiency. For this purpose I have shown a switch 87 in each connection 30 which is connected to or operated simultaneously with the main switch 50 in the corresponding conductor.

In Fig. 7 I have illustrated another embodiment of my invention which is particularly applicable for use where it is desired to have normally closed circuits containing the various current transformer secondaries, and, therefore, a flow of current therein at all times under normal, as well as under abnormal conditions. In Fig. 7, $3^h$, $3^i$, $3^k$, $3^l$, $3^m$, $3^n$, and $3^o$ designate a plurality of conductors connected to the main bus 1. Each conductor is provided with the switch or cut-out 50 which is operated by the magnet 51, all as above described. The circuits 52 of the magnets 51 are all connected in parallel to the tripping buses 65, and each circuit has therein the contacts 54 which are closed by the contact 55 of the relay. Each relay also comprises the fixed and movable coils 4 and 6, which are connected at the junction point 15, and each conductor has associated therewith a current transformer, the secondary coil 14 of which leads to this junction point. Thus far the construction is similar to that shown in Fig. 1. In the present embodiment, however, each circuit 52 is provided with an additional pair of contacts 84 which are associated with the relay for the next adjacent conductor, and these contacts 84 are situated to be normally closed by the contact 55 of said adjacent relay. Moreover, the secondary coils 14 are connected in series by wires 86, and each current transformer is shunted by one coil of one relay and one of the next in series. With this arrangement there will be a plurality of local circuits, each of which is formed by the secondary coil 14 of any current transformer, the stationary coil 4 of the corresponding relay, the movable coil 6 of the next adjacent relay and the wire 86, and each current transformer secondary will be shunted by one coil of one relay in series with one coil of the adjacent relay.

Fig. 7 shows the parts in their normal position, and Figs. 8 and 9 show the same construction in ring or radial formation to better illustrate its operation.

I will now describe the operation of the apparatus as applied to the feeders when such faults result in the flow of so-called reverse currents. Assuming that a short circuit occurs at the point $y$ involving the conductor $3^l$, when a reverse current will be established in the conductor $3^l$ from the bus 1, and such reverse current will induce a potential in the secondary 14 associated with the faulted conductor in a direction relatively opposite to that in the other secondaries, thus causing a current to flow through the local circuit including said secondary, as well as causing all the other current transformers to feed current through their own local circuits. These currents will operatively energize the relays $99^l$ and $99^k$, thus causing the contacts 55 thereof to move away from the contacts 84 and close the contacts 54. This will result in energizing the magnet 51 associated with said faulted conductor and opening the switch 50 to disconnect the conductor from the main bus 1. While the adjacent relay $99^k$ is also operatively energized, thus swinging its contact 55 thereof against the contacts 54, this will not close the tripping circuit 52 for the conductor $3^k$ because said circuit is now open at the contacts 84 due to the operation of relay $99^l$. The presence of these extra contacts 84, therefore, makes this arrangement of apparatus an electrically-interlocking system of such a nature that although two electrically-adjacent relays are operatively energized whenever a fault occurs in any conductor, yet only the relay intended to operate the faulted conductor will be operative to disconnect the said faulted conductor from the bus-bar, and immediately upon such disconnection the normal conditions are restored and all relays return to normal inoperative position.

Fig. 8 shows diagrammatically the structure in Fig. 7 in ring formation, and it illustrates the way in which the device is operated whenever a so-called reverse current is flowing in the faulted conductor. If the construction shown in Figs. 7 and 8 is employed at both ends of the conductors, then when a short circuit occurs at $y$ an increased current will flow to the fault from the bus-bar at the opposite end of the conductor from that shown in Fig. 7 and the manner in which such increased current will operatively energize the relays connected with the faulted conductor is shown in Fig. 9 which is a diagram view similar to Fig. 8. In this diagram the arrows $b$ indicate normal current flow in the conductors $3^h$—$3^n$ and the arrows $d$ illustrate the normal direction of flow in the secondaries 14 of the current transformers. In case of a fault occurring in the conductor $3^l$ at the point $y$ and the consequent development of an increased current in said conductor from the bus-bar 1, such increased current will induce an increased potential in the secondary 14 of the current transformer connected with the conductor $3^l$ and this excess potential will cause an excess current in said secondary as indicated by the double arrow $g$. This excess current will not all pass through the other secondary coils because of the counter-electro motive force which would be developed in the other current transformers by such current, and as a result such excess current will divide and a part will pass through the local relay circuit corresponding to the faulted conductor and a part will pass around through the other local circuits as indicated by the arrows $e$ and thus the two relays either side of the faulted conductor will be operated as described with reference to Fig. 7, thus cutting the faulted conductor out from the system.

In Fig. 10 I have shown a modification of the arrangement shown in Fig. 7 in which the local circuits 6, 86, 14, 4 for the different conductors are entirely separate instead of being connected at the junction points 15. This construction is especially useful in the detection and isolation, at any convenient switching point, of feeders carrying so-called "reverse currents" to a fault as it does not require current balance in the parallel connected feeders, nor is it essential that the feeders be paralleled at the switching points as it will be readily seen that the only necessary requirement is that all the associated conductors shall carry current normally in the same direction and of the same phase. The various conductors, therefore, might run through separate sub-stations provided, of course, that the secondary circuits through the relays are completed between the switching points by suitable conductors.

Whenever a conductor develops a fault and is thereafter isolated from the system by the mechanism which I have above described, it is desirable that the relay and other control apparatus and wiring associated with the faulted conductor should be simultaneously short-circuited, by-passed or isolated, and to accomplish this I may provide some suitable means, such as the short-circuiting jacks shown in Fig. 11. The short-circuiting jack in said figure comprises a member 131 having two fingers 132, one at each end thereof, which fingers are adapted to enter between contacts 133 that are in the circuits including the relay and other associated control apparatus and wiring. The contacts between each pair are normally closed together so as to close the circuit through the said control circuits, but when the jacks are inserted in place the fingers 132 thereof separate the contacts of each pair, thus cutting out the required parts of such control circuits. Each finger has on its outer face a contact 134, and these contacts are connected electrically by a connecting member 135 so that when the jack is inserted in place the desired wiring and control apparatus is cut out, but a circuit is established around such connecting points through the contacts 134, 135. The proper connection of the balance of the relay and control system of wiring and apparatus are thus maintained in an operative condition.

The system above described will also operate to isolate a faulted conductor when the nature of the fault is a so-called "open circuit". In this case the opening of a conductor will kill or deënergize the associated current transformer, thus permitting current to flow in the associated relay circuits from the other current transformers, which current is so distributed as to operatively energize the relays associated with the faulted or open-circuited conductors. Under these conditions there will be no current flow in the faulted conductor provided the two separate ends thereof are not at the same time involved in other faults, but the effect of absence of current in this conductor may be regarded as an abnormal current condition, or perhaps, more accurately, the absence of normal current.

In the accompanying drawings I have shown a single main bus only, but it will be understood that the requisite number of return conductors will be provided as indicated in dotted lines Fig. 1. It will also be understood to those skilled in the art that if this system is applied to a three phase or any multiple-phase system of electrical distribution there will be the requisite number of main busses to correspond to the particular phase of the system and, of course, the requisite number of returns, and that the mechanism herein shown may be duplicated for each bus or phase conductor. I have not thought it necessary to show my invention as applied to a poly-phase system, however, as to do so would merely involve duplication of the wiring connections herein illustrated and would thus unduly complicate and confuse the drawings.

While I have illustrated herein some simple embodiments of my invention I do not wish to be limited to the constructional details shown, nor in any way other than by the appended claims.

Having fully described my invention, what I claim as new and desire to secure by Letters Patent is:—

1. In a device for isolating faulted conductors in an electrical-distributing system, the combination with three or more conductors connected in parallel, of means for disconnecting said conductors from the system, and means rendered operative by the occurrence of a fault in any one of the conductors by which the current in said conductor is either increased, decreased or reversed in direction relative to that in the other conductors to actuate said disconnecting means to isolate said conductor from the system without disturbing in any way the operation of the other conductors.

2. In an electrical distributing system, the combination with two supply and receiving mains, of three or more separate conductors connecting said mains, a cut-out for each end of each conductor for isolating it from the mains, fault-discriminating cut-out actuating means at each end of the conductors, the means at one end being independent from those at the other end, each fault-discriminating cut-out actuating means comprising a relay for each conductor, and means electrically connecting the relays with each other and inductively connecting them with the conductors whereby each relay responds only to fault conditions of any nature in its associated conductor thereby to isolate said conductor from the system without being affected by overload conditions at some other part of the system.

3. In an electrical-distributing system, the combination with supply and receiving mains, of three or more separate conductors connecting said mains, a cut-out for each end of each conductor for isolating it from the main, a relay responsive to fault conditions only for controlling the operation of each cut-out, the relays at each end of the conductors being independent from those at the opposite end, and devices by which the occurrence of a fault in any conductor causes each of the relays associated with the faulted conductor only to become operatively energized thereby to isolate the conductor from the system.

4. In a device of the class described, the combination with a plurality of conductors connected in parallel, of a cut-out for each end of each conductor for isolating it from the system, a plurality of electrically-connected normally-deënergized relays, one associated with each end of each conductor, separate means at each end of the conductors by which the occurrence of a fault in any conductor develops a current flow through the connected relays in a direction to operatively energize the relays associated with the faulted conductor and to non-operatively energize the other relays.

5. In an electrical-distributing system, the combination with two separated bus-bars, of a plurality of parallel-connected conductors connecting said bus-bars, a separate switch connecting each end of each conductor to its bus-bar, a current transformer associated with each conductor at each end thereof, a relay for operating each switch, means electrically connecting the relays at each end of the conductors and connecting each relay to its current transformer, the relays at opposite ends of any conductor acting independently whereby the occurrence of a fault in any conductor causes the relays associated therewith only to actuate their switches.

6. In an electrical-distributing system, the combination with two separated bus-bars, of a plurality of conductors connecting said bus-bars, a switch for connecting each end of each conductor to the bus-bar, a relay and its switch-tripping circuit associated with each conductor at each end thereof, means inductively connecting each relay to its conductor and electrically connecting the relays at each end of the conductors, the relays at opposite ends of the conductors being independent, which means becomes operative upon occurrence of a fault in any conductor to operatively energize the relays corresponding to said conductor to cause them to close their tripping circuits without causing the relays of the healthy conductors to close their tripping circuits.

7. The combination with a main bus-bar, of a plurality of conductors, a switch connecting each conductor with the main bus-bar, a plurality of ring connected relays for operating said switches, means rendered operative by the occurrence of a fault in any conductor which results either in an increase, a decrease, or a reversal in direction of current therein to operatively energize both the relay associated with the faulted conductor and also the relay electrically opposite to said first named relay but to energize the first-named relay with greater intensity than the second whereby said first-named relay will act to isolate the faulted conductor before the second relay becomes operative.

8. The combination with a main bus-bar, of a plurality of conductors, a switch connecting each conductor with the main bus-bar, a plurality of ring connected relays for operating said switches, means rendered operative by the occurrence of a fault in any conductor to operatively energize both the relay associated with the faulted conductor and also the relay electrically opposite thereto but to energize the first-named relay with greater intensity than the second whereby said first-named relay will act to isolate the faulted conductor before the second relay becomes operative, and means to restore all relays to normal deënergized condition when the faulted conductor is isolated.

9. In an electrical-distributing system, the combination with two separated bus-bars, of a plurality of working conductors connecting said bus-bars, a separately operable switch connecting each end of each conductor to its bus-bar, a plurality of switch-operating relays, one for each switch, each relay having two windings, one winding of each relay being connected to the other winding of an adjacent relay, and means inductively connecting said relays to the conductors, the relays at one end of the conductors being independent from those at the other end whereby the occurrence of a fault in any conductor causes the relays associated with said conductor only to be operatively effective.

10. In an electrical-distributing system, the combination with a supply and one or more receiving bus-bars, of a plurality of working conductors connecting said bus-bars, a switch connecting each end of each conductor to its bus-bar, switch-operating relays, one for each switch, and connections for the relays whereby each relay is operatively energized to actuate its switch by the combined action of the so-called reverse current flowing in any conductor due to a fault therein and the current flowing in another conductor.

11. In a device of the class described, the combination with a main bus-bar, of a plurality of conductors, switches connecting said conductors to the bus-bar, switch operating relays, each comprising a fixed coil and a movable coil, said relays being arranged with one coil of one relay connected to one coil of the next adjacent relay, and means for operatively energizing the relay associated with any conductor when said conductor develops a fault.

12. In a device of the class described, the combination with a main bus-bar, of a plurality of conductors, switches connecting said conductors to the bus-bar, switch-operating relays one for each conductor, each relay comprising a fixed coil and a movable coil, and said relays being arranged with one coil of one relay connected to a coil of the next adjacent relay, and a current transformer associated with each conductor, the secondaries of the transformers being connected to the relay circuits.

13. In a device of the class described, the combination with a main bus-bar, of a plurality of conductors, a switch connecting each conductor to the main bus-bar, a switch-operating relay associated with each conductor, means rendered operative by the occurrence of a fault in any conductor to operatively energize the relay associated therewith, and means operative when the switch controlled thereby is opened to reëstablish working connection in the balance of the control circuits containing other relays and associated apparatus.

14. In an electrical-distributing system, the combination with a bus, of three or more separate conductors, a switch for connecting each conductor to the bus, a relay for operating each switch, each relay having two windings, means inductively connecting both windings of each relay to the corresponding conductor and connecting one winding of each relay to the other winding of another relay whereby the occurrence of a fault in any conductor will operatively energize the relay associated therewith only.

15. In an electrical-distributing system, the combination with a bus, of three or more separate conductors, a switch for connecting each conductor to the bus, a relay responsive to fault currents only for operating each switch, a circuit for each relay, said circuits being inductively connected to the conductors and the relays being electrically connected by means which holds the relays in an inoperative condition under normal current conditions but becomes operative upon the occurrence of a fault in any conductor to cause the relay associated with said conductor only to actuate its switch.

16. In an electrical-distributing system, the combination with a bus, of a plurality of separate conductors, a switch for connecting each conductor to the bus, a plurality of relays responsive to fault currents only, one for each conductor, said relays being electrically connected to each other and inductively connected to the conductors by means which causes current flow in the relay of a faulted conductor in a direction to operatively energize said relay and current flow in the other relays in a direction to non-operatively energize said relays whereby when a fault occurs in any conductor said conductor only will be disconnected from the bus-bar.

17. In a device of the class described, the combination with supply and receiving mains or busses, of three or more separate conductors extending between and connecting said mains or busses, a cut-out for each end of each conductor for isolating it from said mains, a relay or cut-out actuating coil inductively associated with each end of each conductor but independent of the equivalent device at the other end of the same conductor, said relay or cut-out coil being responsive to fault conditions only, regardless of their nature or the relative direction of flow of fault currents, and a tripping circuit for each relay for controlling the action of each cut-out whereby the occurrence of a fault in any of the said conductors causes the corresponding cut-out actuating relays or coils and their tripping circuits to be energized without operatively energizing the disconnecting mechanism for the unfaulted conductors.

18. In a device of the class described, the combination with a main bus-bar, of three or more working conductors, a separately-operable switch connecting each conductor with the bus-bar, a plurality of switch-actuating relays and their tripping circuits, one for each conductor, and means rendered operative by the occurrence of a fault in any conductor to cause the associated relay and its tripping circuit to be energized by the combined action of any abnormal current condition in the faulted conductor and the simultaneous current conditions in one or more of the remaining working conductors.

In testimony whereof, I have signed my name to this specification, in the presence of two subscribing witnesses.

WILLIAM H. COLE.

Witnesses:
    LOUIS C. SMITH,
    THOMAS J. DRUMMOND.

Copies of this patent may be obtained for five cents each, by addressing the "Commissioner of Patents, Washington, D. C."